United States Patent Office 3,488,727
Patented Jan. 6, 1970

3,488,727
7α-HYDROXY-16,17-ACETALS AND KETALS OF THE PREGNENE SERIES
Patrick A. Diassi, Westfield, and Pacifico A. Principe, South River, N.J., assignors to E. R. Squibb & Sons, Inc., New York, N.Y., a corporation of Delaware
No Drawing. Filed Mar. 15, 1968, Ser. No. 713,304
Int. Cl. C07c 173/00; A61k 17/06; C10m 1/22
U.S. Cl. 260—239.55          3 Claims

ABSTRACT OF THE DISCLOSURE

This invention relates to the preparation of 7α-hydroxy-16,17-acetals and ketals of the pregnene series, and 16,17-acetals and ketals of the pregnadiene series and intermediates therefor. The 7α-hydroxy products of this invention are prepared by subjecting them to the enzymes of *Thamnidium elegans*. The products of this invention are therapeutically useful materials and posses and anti-inflammatory progestional and adrenocortical activity. In addition, compounds of this invention are useful as anti-oxidants and anti-corrosive agents. They are also surfactants and thus may be employed as emulsifiers and wetting agents.

---

This invention relates to and has as its objective the provision of new physiologically active steroids and new intermediates useful in the preparation thereof.

The final products of this invention can be represented by the general formulae

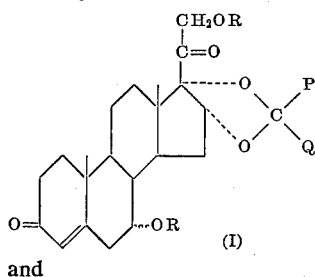

(I)

and

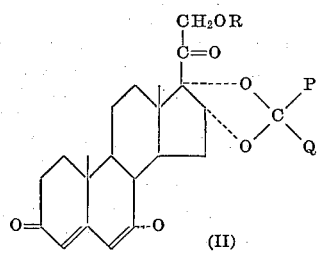

(II)

wherein R is hydrogen or acyl; P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; and, together with the carbon to which they are joined P and Q is a monocyclic cycloalkyl or monocyclic heterocyclic radical.

The preferred acyl radicals employed are those of hydrocarbon carboxylic acids of less than twelve carbon atoms, and may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxyli acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexane-acetic, α-cyclopentanebutyric, 2-cyclopenteneacetic ad 3-(3-cyclohexene) pentanoic acid], and the like.

The term "lower alkyl" as employed herein includes both straight and branched chain radicals of less than eight carbon atoms, for instance, methyl, ethyl, propyl, butyl, pentyl, hexyl, heptyl, octyl, isopropyl, t-butyl, isobutyl, isohexyl, 4,4-dimethylpentyl 2,2,4-trimethylpentyl, and the like.

The term "monocyclic aryl" as employed herein contemplates monocyclic carbocyclic aryl radicals, for instance, phenyl and substituted phenyl radicals, such as lower alkyl phenyl (e.g., o-, m- or p-tolyl, ethylphenyl, butylphenyl and the like), di(lower alkyl)phenyl (e.g., 2,4-dimethylphenyl, 3,5-diethylphenyl, and the like), halophenyl (e.g., chlorophenyl, bromophenyl, iodophenyl fluorophenyl), o-, m- or p-nitrophenyl, dinitrophenyl, (e.g., 3,5-dinitrophenyl, 2,6-dinitrophenyl, and the like), trinitrophenyl (e.g., picryl).

The terms "monocyclic cycloalkyl" and "monocyclic cycloalkenyl" include cyclic radicals containing from 3 to 6 ring members (e.g., cyclopropyl, cyclobutyl, cyclopentyl, cyclohexyl, cyclobutenyl and cyclohexenyl).

The final products of this invention are physiologically active substances which possess progestational activity both orally and parenterally. As such they may be employed in the veterinary field for treating conditions in both large and small animals (e.g., dogs, cats, sheep, cows, horses, and the like) which require a progestational agent. For instance, in animal breeding, the compounds of this invention are useful in preventing threatened abortion and may be administered for this purpose in dosages of about 2 to about 100 mg./kg. of body weight daily. In addition, control of milk and egg production may be achieved by regulation of the cycles of cows and chickens through the administration of the compounds of this invention in daily dosages, also of about 2 to about 100 mg./kg. of body weight.

The products of this invention also possess adrenocortical activity, and may accordingly be employed in lieu of desoxycorticosterone for treating conditions in various mammalian species (e.g., dogs, cats, cattle, horses, and the like) resulting from adrenal insufficiency such as uremia and metabolic disorders with derangement of electrolyte balance. Dosages for such purpose may range from about 2.5 to 5.0 mg. per day in dogs, to about 20.0 to 25.0 mg. per day in cattle, for intance.

They may also be employed in lieu of cortisone as anti-inflammatory agents in the treatment of acute inflammatory and allergic diseases of the eye, skin and mucosa and diseases such as rheumatoid arthritis and rheumatic fever. For these purposes, oral dosages may vary from about 0.05 to 1.5 mg./kg. daily, intrasmuscular dosages from about 0.1 to 4.5 mg./kg. daily, intravenous dosages up to about 1.5 mg./kg. daily (by drip) and topically, they may be administered as a 0.5 to 2.5% suspension, ointment, cream, or the like.

Perorally acceptable formulations can be prepared in the usual manner to provide an aqueous suspension, an elixir or a solid dosage unit form (e.g., tablet, powder, or capsule), for example, two-piece hard gelatin capsules may be filled with a mixture of the active ingredient and excipients (e.g., starch, talc, stearic acid, and/or magnesium stearate). Also one piece gelatin capsules containing the same amount of medicament may be prepared using sufficient corn oil or other suitable vegetable oil, to render the compound capsulatable. Tablets may be prepared by using starch, lactose or other conventional excipients, and may be scored to enable the administration of fractional dosages, if desired. Any of the tableting material used in pharmaceutical practice may be employed. Liquid preparations may be in the form of suspensions, emulsions, syrups or elixirs of the active substance in water or other liquid medium commonly used for making orally acceptable pharmaceutical formulations, such as liquid paraffin, or a syrup elixir base.

The active substance may also be made up in a form suitable for parenteral administration, i.e., as a suspension in sterile water or an organic liquid usually employed for injectable preparations, for example a vegetable oil such as olive oil, or a sterile solution in an organic solvent.

The final products of this invention may be formulated into a preparation suitable for topical administration in conventional manner with the aid of one or more carriers or excipients. Examples of types of topical formulation include ointments, creams, sprays, aerosols, and the like. Ointments and creams may, for example, be formulated with an aqueous or oily base with the addition of suitable thickening and/or gelling agents. Such bases may, for example, include water and/or an oil such as liquid paraffin or a vegetable oil such as castor oil, arachis oil, or the like. Various thickening agents may be employed in accordance with the nature of the base, for example, soft paraffin, aluminum stearate, cetostearyl alcohols, polyethylene glycols, woolfat, hydrogenated lanolin, and the like. Lotions may likewise be formulated with an aqueous or oily base and will in general also include various emulsifying agents, dispersing agents, suspending agents, thickening agents, coloring agents, perfumes, and the like.

In addition, the compounds of this invention (both intermediates and final products) are surface active agents which may therefore be employed in a variety of applications requiring such an agent. For example, the compounds of this invention may be employed as emulsifying agents in the preparation of lubricants, adhesives, polishes, wax compositions, and the like. Further, these compounds are ultraviolet-absorbing materials and may be employed as sun-screening agents. They may also be employed as antioxidants and corrosion inhibitors for various hydrocarbons and mixtures thereof. As example of materials to which the compounds of this invention may be added for this purpose may be mentioned gasoline, hydrocarbon lubrication oils and greases, hydrocarbon solvents (e.g., toluene, kerosene), and the like.

The compounds of this invention may be prepared by subjecting to the action of enzymes of *Thamnidium elegans* a compound having the formula

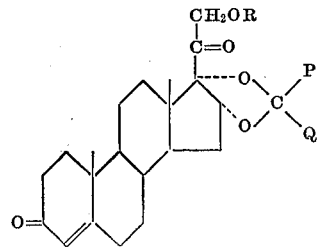

(III)

wherein R represents hydrogen, and P and Q are as set forth above, to produce products of this invention having the formula

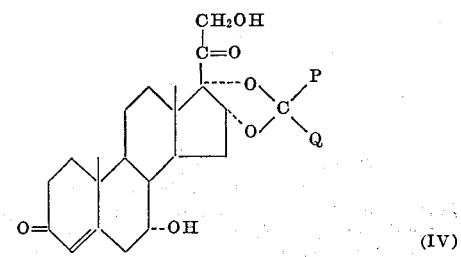

(IV)

wherein P and Q are as set forth above.

Compounds in accordance with Formula IV may be converted to the corresponding 7,21-diacyloxy products of this invention by treatment with an appropriate acid or acid anhydride (e.g., acetic anhydride, propionic anhydride, benzoic anhydride) in the presence of an anhydrous organic base such as pyridine.

The resulting diacyloxy compound may be converted to products of this invention having the formula

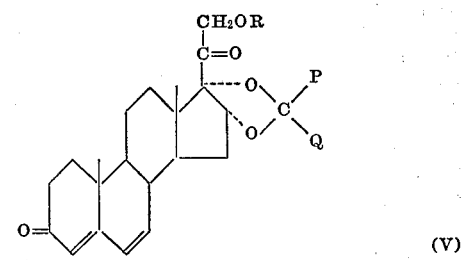

(V)

wherein R represents hydrogen, by treatment with a base such as potassium carbonate.

The corresponding 21-acyl product may then be prepared by acylation of Compound V by conventional methods well known in the art.

Compounds in accordance with Formula V wherein R represents acyl, may also be prepared by dehydrogenation of compounds in accordance with Formula III, for instance, with 2,3-dichloro-5,6-dicyanobenzoquinone followed by hydrolysis.

The enzymatic hydroxylation can best be effected either by including the steroid substrate in an aerobic culture of the microorganism, or by bringing together, in an aqueous medium, the steroid, air and the microorganism. In general, the conditions for culturing the microorganisms for the purposes of this invention are (except for the inclusion of the steroid to be converted) the same as those for culturing various other molds for the production of antibiotics and/or riboflavin.

The microorganism is aerobically grown in contact with (in or on) a suitable fermentation medium. A suitable medium essentially comprises a nitrogenous substance and a source of carbon and energy. The latter may be a carbohydrate (such as sucrose, molasses, glucose, maltose, starch or dextrin) a fatty acid, a fat and/or the steroid itself. Preferably, however, the medium includes an assimilable source of carbon and enrgy in addition to the steroid. The source of nitrogenous factors may be natural (e.g., soybean meal, corn steep liquor, meat extract and/or distillers solubles) or synthetic (i.e., composed of simple, synthesizable organic or inorganic compounds such as ammonium salts, alkali nitrates, amino acids or urea). An adequate sterile air supply should be maintained during fermentation, for example, by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10% by weight. The culture period may vary considerably, e.g., within the range of about 6 to 96 hours. The steroid is then recovered from the fermentation medium in the usual manner, as more fully detailed in the examples following.

The 7 and 21-hydroxy groups may then be acylated in the usual manner, as by treating the steroid with an acid anhydride or acyl chloride of one of the hydrocarbon carboxylic acids of less than twelve carbon atoms mentioned hereinbefore. The reaction is preferably carried out in the presence of an organic base, such as pyridine.

The following examples illustrate the invention, all temperatures being in degrees centigrade:

EXAMPLE 1

7α,16α,17α,21-tetrahydroxypregn-4-ene-3,20-dione 16,17-acetonide

Surface growth from each of 2 two-week old agar slants of *Thamnidium elegans* (ATCC 1637), the slants containing as a nutrient medium (A):

|  | Grams |
|---|---|
| Glucose | 10 |
| Yeast extract | 2.5 |
| $K_2HPO_4$ | 1 |
| Agar | 20 |

Distilled water to one liter.

is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

|  | Grams |
|---|---|
| Cornsteep liquor | 6 |
| $NH_4H_2PO_4$ | 3 |
| Yeast extract | 2.5 |
| Dextrose | 10 |
| $CaCO_3$ | 2.5 |

Distilled water to one liter.

After 24 hours incubation at 25° C. with continuous rotary agitation (280 cycles/minute; two-inch stroke), 10% (vol./vol.) transfers are made to forty 250 ml. Erlenmeyer flasks each containing 50 ml. of freshly sterilized medium (B). Steroid (200 micrograms/ml.) is then added by supplementing each flask with 0.25 ml. of a sterile solution (40 mg./ml.) of 16α-hydroxycortexolone 16,17-acetonide in N,N-dimethylformamide. A total of 400 mg. is fermented.

After approximately 55 hours of further incubation using identical conditions as described above, the contents of the flasks are pooled and the broth is then filtered through a Seitz clarifying pad. The flasks, mycelium and pad are washed with successive 100 ml. portions of warm water. The combined filtrate and washings have a volume of 1900 ml. The filtrate is extracted with 600 ml. of chloroform three times and the combined organic extracts are washed well with water and evaporated under reduced pressure. The residue (267 mg.) is plate chromatographed using silica gel $HF_{254}$ as adsorbent and chloroform-ethyl acetate (1:4, v.:v.) as the developing solvent. Elution of the band which is detectable by U.V. at $R_f \approx 0.4$ by 20% methanol in ethyl acetate gives after evaporation of the solvent 128 mg. of non-crystalline 7α,16α,17α,21-tetrahydroxypregn-4-ene-3,20-dione 16,17-acetonide having $\tau_{CDCl_3}^{SiMe_4}$ 9.35 (s., 18-$CH_3$)

8.81 (s., 19-$CH_3$), 8.84 (s., β-$CH_3$ of acetonide), 8.52 (s., α-$CH_3$ of acetonide), 6.06 (m., $W_H \approx 8$ cps., 7β-H), 5.81, 5.32 (ABq, J=5, 20 cps., 21-$CH_2$—), 4.96 (d., J=4.3, 16β-H), 4.22 (s., 4-H).

EXAMPLE 2

7α,16α,17α,21-tetrahydroxypregn-4-ene-3,20-dione 7,21-diacetate 16,17-acetonide

A solution of 128 mg. of 7α,16α,17α,21-tetrahydroxypregn-4-ene-3,20-dione 16,17-acetonide in 3 ml. of dry pyridine and 1 ml. of acetic anhydride is kept at room temperature for 16 hours, then diluted with ice-water and extracted with chloroform. The chloroform is washed successively with 2 N hydrochloric acid, 5% sodium bicarbonate and water and evaporated under reduced pressure. Crystallization of the residue from acetone-hexane gives 120 mg. of 7α,16α,17α,21-tetrahydroxypregn-4-ene-3,20-dione 7,21-diacetate 16,17-acetonide having a melting point about 200–202° C., $[\alpha]_D^{25}$ +42.1° (chloroform), $\lambda_{max.}^{alc.}$ 237 mμ (ε, 16,780), $\lambda_{max.}^{Nujol}$ 5.69, 5.80, 5.99, 6.20μ, $\tau_{CDCl_3}^{SiMe_4}$ 9.30 (s., 18-$CH_3$)

8.77 (s., 19-$CH_3$), 8.76 (s., β-$CH_3$ of acetonide), 8.53 (s., α-$CH_3$ of acetonide), 7.98 (s., 7-OAc), 7.82 (s., 21-OAc), 5.04 (s., 21-$CH_2$—), 4.29 (s., 4-H).

*Analysis.*—Calcd. for $C_{28}H_{38}O_8$ (502.58): C, 66.91; H, 7.62. Found: C, 67.14; H, 7.34.

EXAMPLE 3

16α,17α,21-trihydroxypregna-4,6-diene-3,20-dione 16,17-acetonide 21-acetate

To a solution of 385 mg. (0.866 mmol.) of 16α,17α,21-trihydroxypregn-4-ene-3,20-dione 16,17-acetonide 21-acetate in 15 ml. of purified dioxane 216 mg. (0.953 mmol.) of 2,3-dichloro-5,6-dicyanobenzoquinone is added. To the stirred solution dry hydrogen chloride gas is bubbled for four minutes during which time 2,3-dichloro-5,6-dicyanohydroquinone separates. After one hour at room temperature, the mixture is filtered and the precipitate washed with dioxane. The combined filtrate and washings are evaporated and the residue redissolved in 20 ml. of benzene-chloroform (1:1,v.:v.) and passed through 30 g. of alumina (Activity V). The alumina is washed with an additional 200 ml. of this solvent and the filtrate is evaporated under reduced pressure. Crystallization of the residue from acetone-hexane gives 300 mg. of 16α,17α,21-trihydroxypregna-4,6-diene-3,20-dione 16,17-acetonide 21-acetate having a melting point about 197–199° C., $[\alpha]_D^{25}$ +90.6° (chloroform), $\lambda_{max.}^{alc.}$ 284 mμ (ε, 24,700), $\lambda_{max.}^{Nujol}$ 5.74, 5.82, 6.04, 6.20, 6.32μ, $\tau_{CDCl_3}^{SiMe_4}$ 9.26 (s., 18-$CH_3$)

8.88 (s., 19-$CH_3$), 8.75 (s., β-$CH_3$ of acetonide), 8.52 (s., α-$CH_3$ of acetonide), 7.82 (s., 21-OAc), 4.31 (s., 4-H), 3.90 (s., 6 and 7-H).

*Analysis.*—Calcd. for $C_{26}H_{34}O_6$ (442.53): C, 70.56; H, 7.74. Found: C, 70.85; H, 7.97.

EXAMPLE 4

16α,17α,21-trihydroxypregna-4,6-diene-3,20-dione 16,17-acetonide (a) From 16α,17α,21-trihydroxypregna-4,6-diene-3,20-dione 16,17-acetonide 21-acetate.—To a mixture of 100 mg. of 16α,17α,21-trihydroxypregna-4,6-diene-3,20-dione 16,17-acetonide 21-acetate in 10 ml. of oxygen-free methanol is added under nitrogen 1 ml. of 10% potassium carbonate (oxygen free) and the mixture stirred at room temperature for one hour. The mixture is neutralized with 10% acetic acid diluted with water and extracted with chloroform. The chloroform is washed with water and evaporated under reduced pressure. Crystallization of the residue from acetone-hexane gives 50 mg. of 16α,17α,21-trihydroxypregna-4,6-diene-3,20-dione 16,17-acetonide having a melting point about 210–215° C, $[\alpha]_D^{25}$ +76.4°;

$\lambda_{max.}^{alc.}$ 2.85 mμ (ε, 25,160), $\lambda_{max.}^{Nujol}$ 2.82, 5.89, 6.01, 6.20, 6.31μ, $\tau_{CDCl_3}^{SiMe_4}$ 9.33 (s., 18-$CH_3$)

8.88 (s., 19-$CH_3$), 8.83 (s., β-$CH_3$ of acetonide), 8.53 (s., α-$CH_3$ of acetonide), 4.90 (d., J=4 cps., 16β-H), 4.30 (s., 4-H), 3.73 (s., 6 and 7-H).

*Analysis.*—Calcd. for $C_{24}H_{32}O_5$ (400.50): C, 71.97; H, 8.05. Found: C, 72.14; H, 8.12.

(b) *From 7α,16α,17α,21-tetrahydroxypregn-4-ene-3,20-dione 16,17-acetonide 21-acetate.*—Following the procedure of part (a) of this example but substituting 7α,16α,17α,21-tetrahydroxypregn-4-ene-3,20-dione 16,17-acetonide 21-acetate for the 16α,17α,21-trihydroxypregna-4,6-diene-3,20-dione 16,17-acetonide 21-acetate there is obtained 16α,17α,21 - trihydroxypregna-4,6-diene - 3,20-dione 16,17-acetonide.

The invention may be variously otherwise embodied within the scope of the appended claims.

What is claimed:
1. The compound having the formula

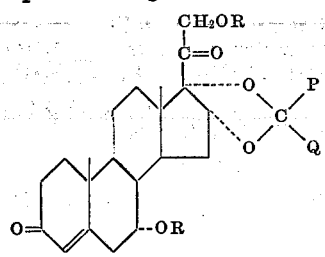

wherein R is selected from the group consisting of hydrogen and acyl radicals derived from hydrocarbon carboxlic acids of less than 12 carbon atoms; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; and P and Q together is selected from the group consisting of monocyclic cycloalkyl and monocyclic heterocyclic radical.

2. A compound in accordance with claim 1 having the name 7α,16α,17α,21 - tetrahydroxypregn - 4 - ene - 3,20-dione 16,17-acetonide.

3. A compound in accordance with claim 1 having the name 7α,16α,17α,21 - tetrahydroxypregn - 4 - ene - 3,20-dione-7,21-diacetate 16,17-acetonide.

References Cited

UNITED STATES PATENTS

| | | | |
|---|---|---|---|
| 3,071,579 | 1/1963 | Ringold et al. | 260—239.55 |
| 3,177,231 | 4/1965 | Fried | 260—397.45 |

LEWIS GOTTS, Primary Examiner

ETHEL G. LOVE, Assistant Examiner

U.S. Cl. X.R.

44—63, 78; 106—3, 14, 270; 195—51; 250—83; 252—56, 52, 89, 170, 356, 396, 407, 522; 424—241

PO-1050
(5/69)

UNITED STATES PATENT OFFICE
CERTIFICATE OF CORRECTION

Patent No. 3,488,727                            Dated   January 6, 1970

Inventor(s)  Patrick A. Diassi and Pacifico A. Principe

It is certified that error appears in the above-identified patent and that said Letters Patent are hereby corrected as shown below:

Column 1, line 19, after "possess" delete - - and - -; and that portion of formula (II) which reads

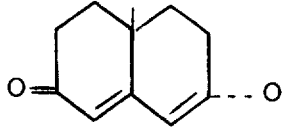                should read               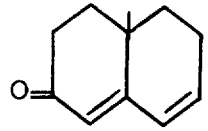

Column 2, line 9, "boxyli" should read - - boxylic - -; and on line 13, "ad" should read - - and - -.

SIGNED AND
SEALED
JUL 14 1970

(SEAL)
Attest:

Edward M. Fletcher, Jr.
Attesting Officer

WILLIAM E. SCHUYLER, JR.
Commissioner of Patents